United States Patent [19]
Nohr et al.

[11] 3,906,976
[45] Sept. 23, 1975

[54] THERMALLY ACTIVATED BURST DISC
[75] Inventors: Gary Dean Nohr; Francis Richard Bollenbach, both of Rockford, Ill.
[73] Assignee: Sundstrand Corporation, Rockford, Ill.
[22] Filed: Mar. 21, 1973
[21] Appl. No.: 343,511

[52] U.S. Cl. .................. 137/68; 137/74; 220/89 B
[51] Int. Cl.² .................................... F16K 17/38
[58] Field of Search .................. 137/68–74; 220/89 A, 89 B

[56] References Cited
UNITED STATES PATENTS

| | | | |
|---|---|---|---|
| 1,068,675 | 7/1913 | Lightfoot | 220/89 B |
| 3,514,013 | 5/1970 | Wolf et al. | 220/89 A |
| 3,667,644 | 6/1972 | Fortmann | 220/89 A |
| 3,693,691 | 9/1972 | Summers | 137/68 X |

Primary Examiner—Martin P. Schwadron
Assistant Examiner—Richard Gerard
Attorney, Agent, or Firm—Paul H. Gallagher

[57] ABSTRACT

A burst disc unit for safety relief use in a fuel tank, responsive to temperature, and bursting at a predetermined temperature. It includes a housing with a disc element sealed thereon, and eutectic material in the housing supporting the disc element. Also knife blades are provided in the housing. Upon the predetermined temperature being reached, the eutectic material melts and runs out and the fuel in the tank forces the disc element against the knife blades and bursts, or cuts, or breaks it and the fuel runs out.

4 Claims, 5 Drawing Figures

THERMALLY ACTIVATED BURST DISC

FIELD OF THE INVENTION

The invention resides in the field of fuel tanks which are adapted particularly for aircraft although they may be put to other uses. In the use of such fuel tanks, measures must of course be taken to provide against danger from possible explosion or accidental ignition. Such explosion can result from excessive temperatures, and the burst disc of the present invention is for use in providing fuel release in the event of excessive temperatures, or explosions due to excessive temperatures.

OBJECTS OF THE INVENTION

A broad object of the invention is to provide a burst disc unit for use in fuel tanks, responsive to temperature and bursting upon a predetermined temperature being reached, that is of novel construction and particularly effective in bursting or breaking under the danger conditions of temperature referred to.

Another object is to provide a burst disc unit of the kind just immediately referred to, having novel sealing means in the form of a disc element which is effective for sealing the disc unit against leakage of fuel through the unit.

Still another object is to provide a burst disc unit of the kind just referred to which incorporates eutectic material which provides mechanical support for the disc element, this eutectic material melting and flowing out upon a predetermined temperature of the fuel being reached, whereupon the fuel is then effective for bursting or breaking the disc element.

A still further object is to provide a burst disc unit of the kind just referred to which incorporates knife blades placed in operative position for engagement by the disc element upon dissipation of the eutectic material, whereby to facilitate bursting or breaking of the disc element in response to the fuel working against it, which forces it into cutting or puncturing engagement with the knife blades.

Still another object is to provide a novel method of making a burst disc unit of the kind referred to above.

DESCRIPTION OF A PREFERRED EMBODIMENT

Figure 1:
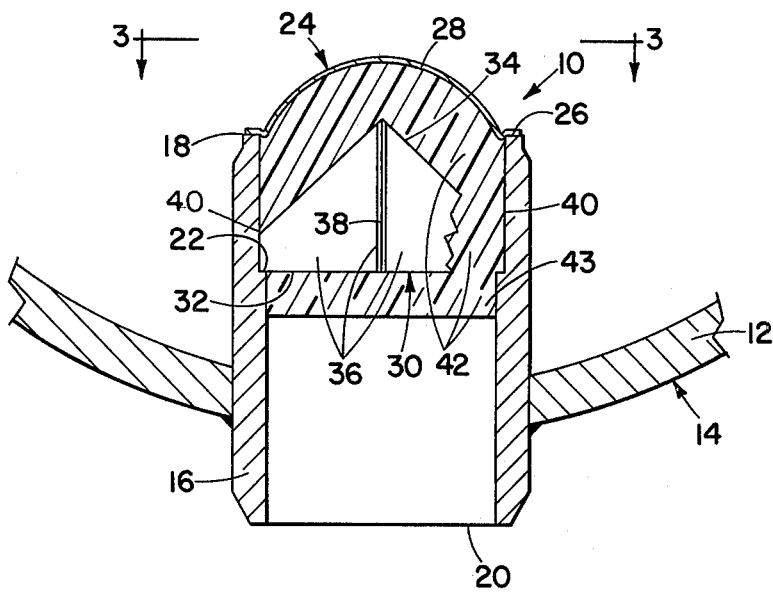
FIG. 1 is an axial sectional view of the burst disc unit of the invention, and a fragment of the wall of a fuel tank in which it is mounted.
Figure 2:
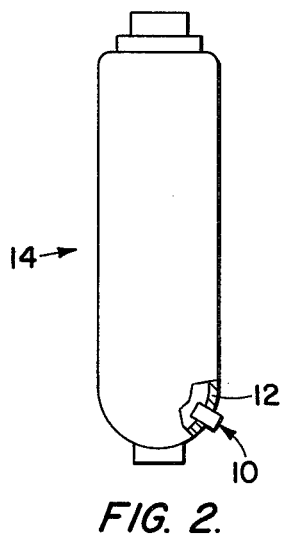
FIG. 2 is a small scale view of a fuel tank, mainly in elevation but partially in section, showing the burst disc unit mounted therein and its relation to the tank.

Referring in detail to the accompanying drawings, attention is directed first to FIG. 1 which shows the burst disc unit as a whole at 10 mounted in a wall element 12 of a fuel tank 14. FIG. 2 shows such a fuel tank of known kind, the tank having the wall element 12 referred to. The burst disc unit 10 may be mounted in any desired location or position in the tank, but in the case of liquid fuel it is preferably mounted near the bottom of the tank to enable a maximum amount of the fuel to drain from the tank when the unit is burst.

In aircraft and appurtenances thereof, it is desired to keep weight at a minimum, and to that end the structural elements, at least in most part, of the device are made of light weight metal such as aluminum. The invention however is not limited to the use of any particular material.

Referring particularly to FIG. 1, the burst disc unit 10 includes a tubular housing 16, preferably of aluminum, cylindrical in shape and open at both ends, and for convenience it will be referred to as having an inner end 18 and an outer end 20, these orientations being related to its use in the fuel tank. The tubular housing is provided with an internal annular shoulder 22 facing toward the inner end. A burst disc element 24 is secured to the inner end of the housing, this burst disc element being of thin aluminum, or heavy gauge aluminum foil. In its overall dimension it is of a maximum diameter greater than the outer diameter of the housing, and its marginal edge is sealingly secured to the inner end of the housing, preferably by electron beam welding, at 26. The central portion or body portion of the disc element indicated at 28, is in the form of a dome extending beyond the inner end of the housing, to an effect referred to hereinbelow.

Figure 3:
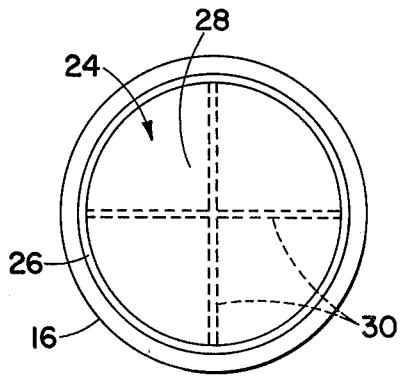
FIG. 3 is an end view taken at line 3—3 of FIG. 1.

Incorporated in the unit is knife blade means 30, preferably in the form of a cross (FIG. 3) with its base edge, or outer edge, preferably of planar form as indicated at 32, and its other edge pointed as indicated at 34, the blade elements 36 themselves preferably having sharp edges as indicated at 38. The blade elements may be provided with substantial axial dimension at their outer edges as indicated at 40 for engaging the wall of the housing and providing solidity to the blade means. A quantity or mass of support material 42 is provided in the housing, which is of eutectic characteristics.

The burst disc unit is put together first by inserting the knife blade means 30 into the housing through the inner end thereof and fitting it against the shoulder 22. Then the disc element 24 is applied and secured and sealed to the end of the housing, as referred to above. Then the housing with the disc element thereon is "inverted", i.e., with its inner end down and its outer end 20 in upward position, and the support material or eutectic material 42 is then inserted into the housing, this material then being in liquid form, and it is then permitted to cool to harden. The material flows in against the disc element and fills the angular spaces between the blade elements or on opposite sides thereof, this last relation being shown at the right hand portion of the blade means in FIG. 1, it being desired to show the blade means generally in elevation for convenience. The specific amount of eutectic material 42 is as desired, an example being as in FIG. 1, sufficient to extend beyond the blade means in direction toward the outer end 20, as indicated at 43.

The exact temperature at which the eutectic material 42 melts may be as desired, but a specific example of such may be 257° F., plus or minus 1°. This temperature is found desirable in the use of the device in the manner referred to above, namely in aircraft. The fuel tank will explode when the fuel therein reaches its auto-ignition temperature, or a decomposition temperature, and of course relief must be provided for the fuel to escape at a temperature well below that temperature, or as in the case referred to at 257° F.

The eutectic material 42 provides mechanical support to the disc element 24, having substantial mass and being bonded to the inner wall of the housing 16, as well as having support from the shoulder 22. This then retains the disc element in position, and in the present case in dome shape, bulging away from the inner end of the housing, and capable of withstanding the pressure requirements of the fuel tank.

Figure 5:
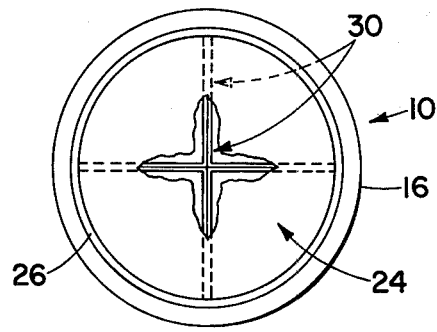
FIG. 5 is an end view taken at line 5—5 of FIG. 4.
Figure 4:
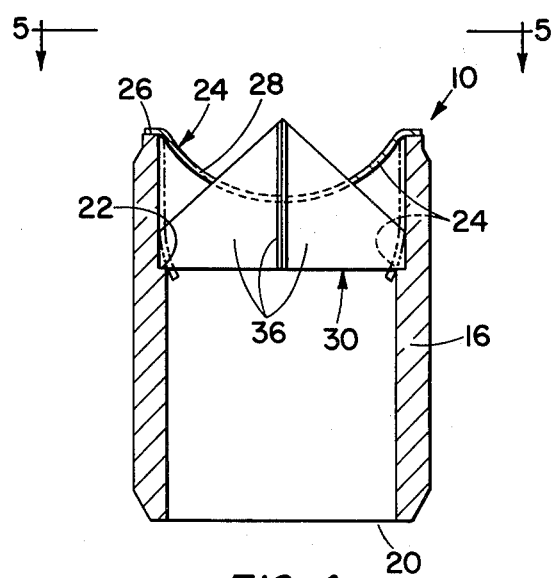
FIG. 4 is a view similar to FIG. 1 but with the burst disc element after it has been burst or punctured.

Upon the temperature reaching the latter point referred to, the eutectic material 42 melts and it runs out of the housing. The weight of the liquid fuel in the tank then forces the disc element 24 outwardly through the inner end of the housing as represented in FIG. 4, against the knife blade means 30. The point and knife edges of the blade elements burst or puncture or cut the disc element under the continued imposition of weight from the fuel. Such a condition is shown in FIGS. 4 and 5. Still further imposition of the weight of the fuel against the disc element will cut it still more, or tear it, and the portions will then be moved or flexed downwardly and radially outwardly against the inner surface of the housing as represented in dot-dash lines in FIG. 4.

We claim:

1. A burst disc unit comprising, a tubular housing adapted for mounting in a container, and having an inner end and an outer end, a rupturable disc element sealingly secured to the housing at the inner end of the latter and being dome-shaped and extending beyond the inner end of the housing, knife blade means having a plurality of blade elements in the housing with cutting edges presented to the disc element and positioned for engagement by the disc element, and puncturing of the latter, in response to flexure of the central portion of the disc element through the inner end of the tubular housing, and solid eutectic material in the housing and extending between the blade elements, and substantially embedding the knife blade means, and filling the inner end portion of the housing and bonded to the housing and retaining the knife blade means in position in the housing, and further extending inwardly of the housing to a position at least as far as the inner extremity of the knife blade means and thereby preventing the disc element from engaging the knife blade means, the eutectic material being meltable at a predetermined temperature enabling pressure against the disc element to move it against the knife blade means and puncturing it.

2. A burst disc unit according to claim 1 wherein the solid eutectic material normally engages the disc element and retains the latter in its dome shape.

3. A burst disc unit according to claim 2 wherein the housing includes an internal shoulder facing inwardly relatively to the housing, the knife blade means rests against the shoulder and is positively limited thereby from being displaced outwardly, and the solid eutectic material also engages the shoulder and extends outwardly beyond the shoulder and thus beyond the knife blade means.

4. A temperature sensitive relief unit for use in containers containing liquid or gas fluids comprising, a housing member having an inner end disposed to the interior of the container, a flexible rupturable sealing means disposed at said inner end of the housing for preventing the fluid from flowing through said housing member, eutectic means, meltable at a predetermined temperature and disposed adjacent said sealing means, for supporting said sealing means against flexure, and puncturing means, secured to said housing member and encompassed by said eutectic means, for rupturing said sealing means when said eutectic means melts and said sealing means flexures against said puncturing means.

* * * * *